Nov. 1, 1932.  S. N. BUCHANAN  1,885,228
CABLE CONNECTER
Filed June 11, 1930   3 Sheets-Sheet 1

Inventor
STEPHEN N. BUCHANAN
By his Attorney
John M. Montstream

Nov. 1, 1932.    S. N. BUCHANAN    1,885,228
CABLE CONNECTER
Filed June 11, 1930    3 Sheets-Sheet 2

Inventor
STEPHEN N. BUCHANAN
By his Attorney
John M. Montstream

Nov. 1, 1932.  S. N. BUCHANAN  1,885,228
CABLE CONNECTER
Filed June 11, 1930   3 Sheets-Sheet 3

Inventor
STEPHEN N. BUCHANAN
By his Attorney
John M. Montstream

Patented Nov. 1, 1932

1,885,228

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed June 11, 1930. Serial No. 460,317.

This invention relates to connecters by means of which a cable or conduit is firmly clamped within the connecter and the connecter is firmly anchored within a box hole in an outlet box so that the cable or conduit is securely fastened to the box at a box opening. The electrical wires in the cable or conduit pass into the outlet box through the opening.

An object of the invention is to devise a cable connecter which consists of two sections, rockable with respect to each other so that the end of the connecter may be contracted for insertion in a box hole opening and expanded by rocking the two sections relatively to each other to expand the contracted end and anchor the connecter in a box hole opening, including means for clamping a cable therein which is entirely independent of the means which control and enforce rocking of the two sections relatively to each other to anchor the connecter within the box hole opening.

Another object of this invention is to provide a connecter which is anchored into a box hole opening by making the connecter in two sections and rocking the two sections relatively to each other upon a rocker or rockers to expand and anchor the connecter in a box hole and also provides means which form a closure for the opening between the two members caused by the rocker or rockers.

Other objects of the invention will be more apparent from the following description taken in connection with the accompanying drawings in which:

Figure 1 is a section through a box hole opening in an outlet box with box hole anchorage means upon the expansible end of the two section connecter, the box hole anchorage means being in closed or contracted relation and extending into the opening prior to the expansion and anchorage of the anchorage means within the opening. A portion of the connecter is broken away to more clearly show the rocking means or rockers.

The connecter of this invention consists of two sections or parts which are pivoted with respect to each other upon rockers or some similar construction so that one end of the connecter may be contracted for insertion in a box hole and expanded to anchor this end within the box hole. Operating means, which are preferably screws, rock the sections relatively to each other to obtain the expansion of the box hole anchorage means upon the expansible end of the connecter and anchorage of the connecter in the box hole. The operating means, by which expansion of the end of the connecter and the box hole anchorage means is obtained, performs this function independently of any other means provided upon the connecter.

Clamping means are also provided with the connecter which clamp a cable or conduit therein. This cable clamping means performs its function of clamping the cable within the connecter independently of the operating means. It will be seen, therefore, that the connecter provides separate and distinct means for anchoring the connecter within the box hole and a separate and distinct means for clamping a cable or conduit within the connecter each of which functions independently of the other.

Where the pivots or rockers upon which the rocking of the two sections of the connecter is obtained are positioned and rock upon the edges of the sections, a space remains in the interior of the connecter between the edges of the sections. The connecter provides a closure means or shields along the sides of the connecter to close the openings or spaces so that the connecter is completely enclosed and offers no easy passage for short circuit flashes from within the box to the exterior.

Figure 1:
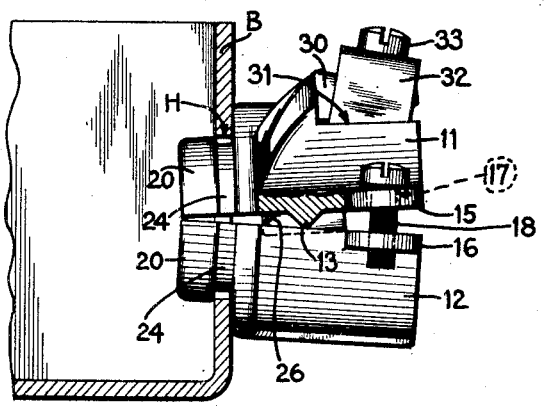

The connecter, to be described herein, is shown in Figure 1 as being split longitudinally to form two sections 11 and 12 which sections together make up the complete connecter member. The section 11 is shown provided with a rocker or rocking projection 13 contacting with the edge of the section 12. One such rocker 13 is preferably provided on each edge of the section 11 and preferably contacts with the adjacent edge of the section 12. The rockers 13 are also shown as being positioned centrally of the section 11. The preferred construction and position of the rockers is as described herein and shown upon the drawings, but it is clear that any equivalent construction by which rocking of the sections is obtained to expand the box hole anchorage means is contemplated by the invention.

Each section 11 and 12 is provided with a pair of co-operating ears 15 and 16. One of these ears, such as the ear 15, has a hole 17 therethrough of a diameter sufficient to afford ample clearance for the screw 18, which is threaded into the ear 16, so that rocking of the sections is not interfered with. It is clear that tightening of the screw 18 will cause the sections 11 and 12 to rock respectively to each other upon the rockers 13 as a fulcrum and cause the end of the connecter opposite from the ears 15 and 16 to expand. Loosening of the screws 18 will permit the end of the connecter to be contracted. The screws and associated structure form the operating means for rocking the sections.

The ends 20 of the sections 11 and 12 are of just sufficient diameter so that the end of the connecter member is small enough in diameter when contracted to readily pass through the box hole H in the box B. A circumferential groove 24 is cut into the end of each section which is wide enough to receive the edge of the box hole. Upon expansion of the end of the connecter member by the tightening of the operating means or screws 18, the edge of the box hole H enters into the grooves 24 and presses against the box hole edge to securely anchor the connecter member within the box hole opening. The grooves 24 together form the box hole anchorage means by which the connecter member formed by the sections 11 and 12 is anchored within the box hole. Also the rockers 12 and the screws 18 with their associated ears 15 and 16 together form the means for rocking the sections whereby expansion and contraction of the end of the connecter member and the box hole anchorage means is secured.

Upon either side of the connecter there is a closure or shield 26 which covers the opening between the two sections 11 and 12 resulting from the rockers 13 being positioned upon and engaging the edges of the sections respectively. These shields 26 form a closure for the connecter so that there is no direct opening to the interior of the connecter and the outlet box through the sides of the connecter member.

Cable or conduit clamping means are provided upon the connecter member. The preferred clamping means consists of a thickened portion 30 upon one of the sections in which a pair of slots 31 extend into the interior of the connecter member. A U-shaped clamping member 32 has the legs of the U of the clamping member passing through the slots 31 for engagement with a cable or conduit within the connecter member. A clamp screw 33 passes loosely through the U-shaped clamping member 32 and is threaded into the thickened portion 30 of the section 11. Upon tightening of the clamp screw 33 the clamping member 32 is advanced into the connecter member formed by the sections 11 and 12 and securely clamps a cable C or a conduit therein. This cable or conduit clamping means is illustrative merely of any type of clamping means for securely clamping a conduit or cable within the connecter member and any type of clamping means carried by the connecter member is contemplated by the invention.

The connecter member formed by the sections 11 and 12 may be of any shape or form so long as it provides two longitudinal sections which together form the whole connecter member. In the preferred construction, however, the sections 11 and 12 are semi-circumferential and together form a cylindrical shell. Each of the sections 11 and 12 therefore form half of the connecter member. Similarly both of the rockers 13 need not be provided upon one of the sections, such as the section 11, nor do they need to engage the edges of the section 11. It is clear that any means which enables the two longitudinal sections to be rocked relatively to each other so that the end of the connecter member carrying the box anchorage means expands and contracts, is within the scope of the invention. Similarly, the means by which pressure may be exerted to rock the sections relatively to each other to expand the expansible end of the connecter member, may take any form although the ears and cooperating screw 18 shown in the drawings is the preferred construction.

Figure 2:
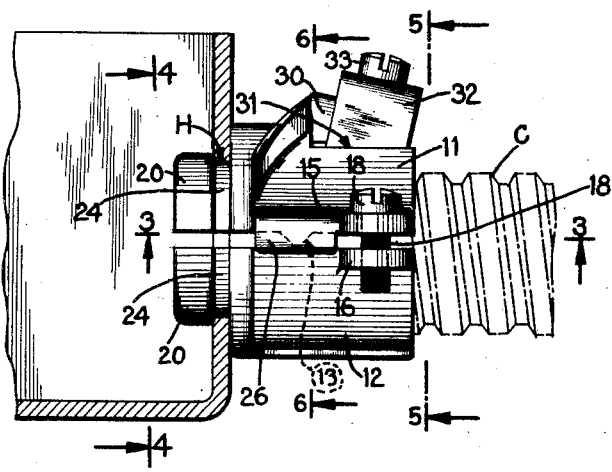
Figure 2 shows the connecter with the box hole anchorage means expanded and anchored in the box hole.
Figure 3:
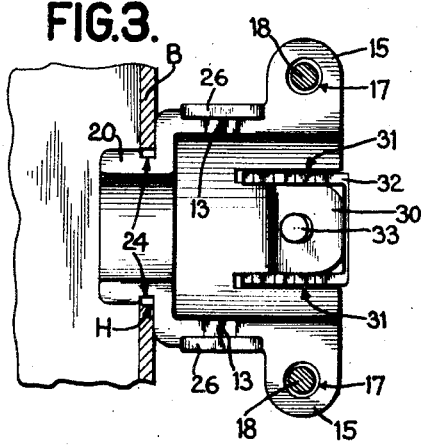
Figure 3 shows the interior of one of the sections of the connecter with the rockers and the conduit or cable clamping means as viewed from line 3—3 of Figure 2.
Figure 4:
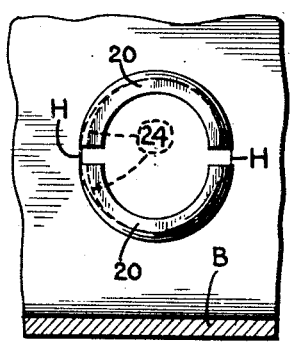
Figure 4 is an end view of the connecter from within the box after the ends of the sections of the connecter are expanded and anchored within the box hole.
Figure 5:
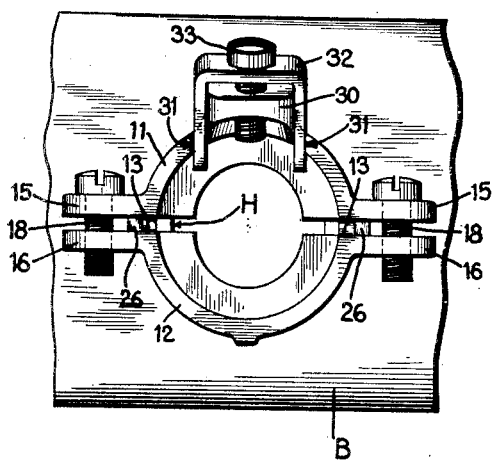
Figure 5 is an end view of the connecter anchored within a box hole opening as viewed from the exterior of the box.
Figure 6:
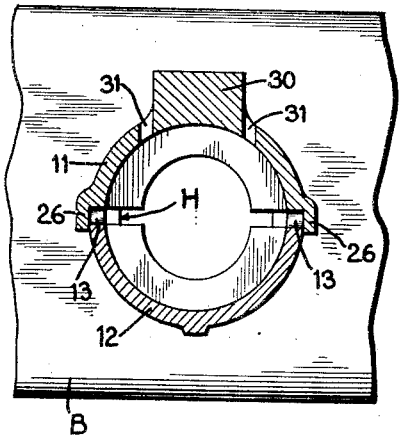
Figure 6 is a cross section through the connecter and the side closures or shields taken on line 6—6 of Figure 2, and with the connecter anchored within a box hole.

In using the connecter the two sections 11 and 12 of the connecter member are assembled together so that the rockers 13 contact with the edge of the section 12 and the screws 18 project through the holes 17 in the ears 15 and are threaded in the ears 16. The screws 18 are extended permitting the ends 20 of the sections 11 and 12 to be contracted. The ends 20 are now inserted within the box hole H of the box B. The screws 18 are then tightened which draws the ears 15 and 16 together and rocks the sections upon the rockers 13 to expand the ends 20 so that the edge of the box hole H enters the grooves 24 and securely anchors the connecter within the box hole. The connecter when anchored within the box hole H takes the position shown in Figure 2. The manner in which the edge of the box hole H enters the grooves 24 and securely anchors the connecter member in the box hole is shown in Figure 4.

When the connecter is securely anchored within the box hole, a cable C or a conduit is inserted into the end of the connecter member and the screw 33 is tightened to draw the clamping member 32 into clamping contact with the cable C. The clamping member 32 thereby firmly clamps the cable or conduit within the connecter member. It will be observed that the box hole anchorage means and the cable or conduit clamping means function entirely independently of each other. This independent functioning of the anchorage means and the clamping means makes it an easy matter for a workman to insert and anchor the connecter within a box hole and then to clamp a cable therein.

Figure 7:
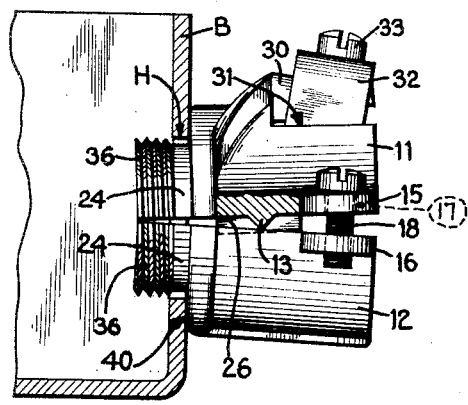
Figure 7 shows the connecter with the ends of the two sections contracted and projecting into a box hole with two forms of box hole anchorage means thereupon to anchor the connecter in either a thin walled or a threaded box hole opening.
Figure 8:
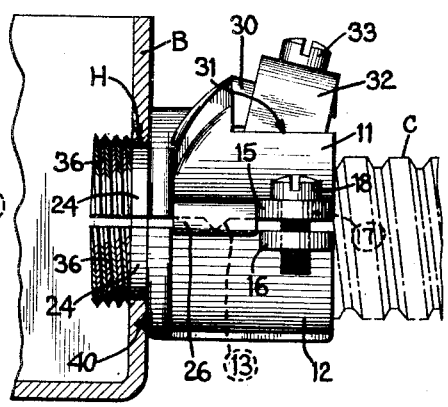
Figure 8 shows the connecter with the two forms of box hole anchorage means expanded in a thin walled box hole to anchor the connecter therein.

A dual form of box hole anchorage means for the connecter is shown in Figures 7 and 8. In this construction the ends 36 of the sections 11 and 12 are threaded. In other respects the construction of the connecter is the same as that shown in Figures 1 through 6. The sections having the threaded ends 36 are provided with a groove 24 similar to the groove shown in Figures 1 through 6 inclusive.

The connecter shown in Figures 7 and 8 is assembled in the same manner as the connecter shown in Figures 1 through 6 where the groove 24 is utilized to anchor the connecter in a thin walled box hole opening. The operating screws 18 are extended so that the sections 11 and 12 may be rocked upon the rockers 13 and the ends 36 may be contracted for insertion into the box hole opening H. When the ends 36 are contracted, they are inserted within the box hole opening H, in which position the ends are ready for expansion. The screws 18 are next tightened to expand the ends 36 so that the edge of the box hole H enters the grooves 24 and is firmly pressed against the bottom of the groove. A cable C may then be inserted into the connecter member and the screw 33 tightened to bring the cable clamping member 32 into clamping engagement with the cable.

Figure 9:
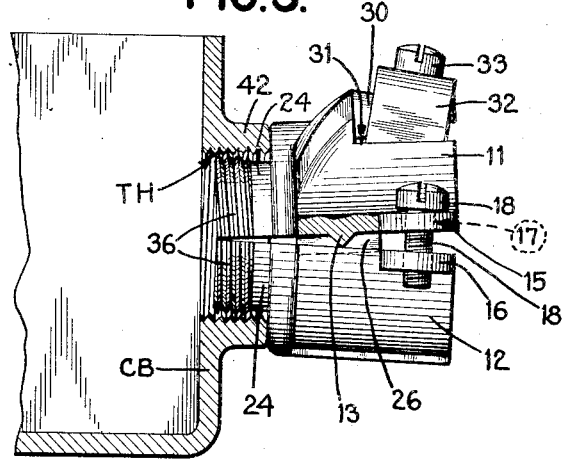
Figure 9 shows the connecter with the dual box hole anchorage means contracted within a thick wall box having a threaded opening.
Figure 10:
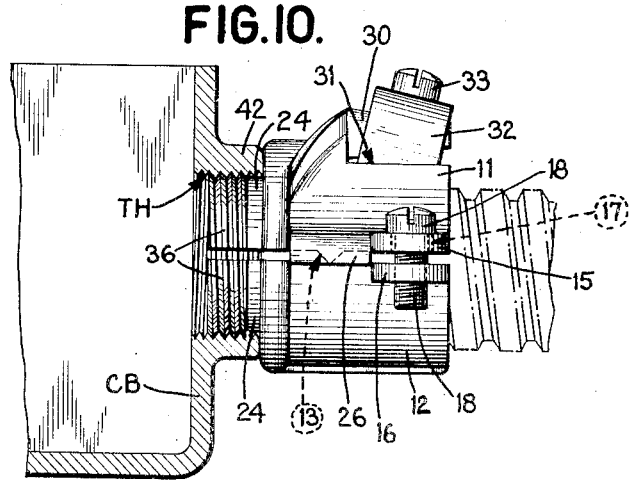
Figure 10 shows the connecter of Figure 9 expanded within the threaded opening to anchor the connecter therein.

The connecter of Figures 7 and 8 is shown contracted in Figure 9 and inserted within a threaded box hole opening TH of a cast outlet box CB and in Figure 10 the connecter has been expanded so that the threads on the threaded end 36 engage the threads in the threaded box hole opening TH to firmly anchor the connecter within the opening. The boss 42 extends from the box CB so that the box hole opening has sufficient depth to provide several threads for engagement with the threads on the connecter by means of which threads the connecter is anchored within the box hole opening. In anchoring the connecter within such a screw threaded box hole opening, the operating screws 18 are tightened to rock the sections 11 and 12 on the rockers 13 and expand the ends 36 so that the screw threads upon the connecter engage the screw thread of the threaded box hole opening TH. The threaded box hole constitutes therefore threaded means engaged by the threads upon the expansible end of the member when this end is expanded for securing the connecter in the box hole to form a box assembly. Continued tightening of the screws 18 brings the surfaces of the threads on the threaded ends 36 into forcible contact with the threads in the box hole opening TH to firmly anchor the connecter therein. A cable or conduit is anchored within the connecter by the clamping means 32—33 as described with respect to the connecter shown in Figures 1 through 6.

The connecter described herein comprises two longitudinal sections forming a connecter member which sections are adapted to rock with respect to each other so that one end of the connecter member is contractible to permit that end of the member to be inserted within the box hole opening and expansible to expand and anchor the member therein. Box hole anchorage means, two forms of which are shown, are provided upon the end of the connecter member. As shown in Figures 5 through 10, two forms of box hole anchorage means may be provided upon one connecter so that one anchorage means is adapted to be anchored in either a thin walled plain box hole opening or a threaded box hole opening such as are found upon cast boxes. One connecter is therefore suitable to be used irrespective of whether a thin walled or cast type of outlet box is used in the wiring installation.

A cable or conduit clamping means is also provided upon the connecter member to clamp a cable or conduit within the connecter member and the term cable contemplates both the cable and conduit. This cable or conduit clamping means functions entirely independently of the box hole anchorage means and similarly, the box hole anchorage means functions entirely independently of the cable or conduit clamping means.

Having described my invention it is to be understood that the invention is not to be limited by the specific construction shown in the drawings and described herein, excepting as limited by the accompanying claims.

What is claimed is:

1. A connecter comprising a member formed of two longitudinal sections, rockers upon one of the sections engaging the edge of the other section, operating means to rock the sections relatively to each other to expand and contract one end of the member, box hole anchorage means upon the expansible end of the member, clamping means independent of the operating means to clamp a cable or conduit within the member, and closure means closing the space between the sections caused by the rockers.

2. A connecter comprising a member formed of two longitudinal sections, rockers upon one of the sections substantially midway between the ends of the section and engaging the other section, operating means to rock the sections relatively to each other to expand and contract one end of the member, and clamping means independent of the operating means to clamp a cable or conduit within the member.

3. A connecter comprising a member formed of two longitudinal sections, rockers upon one of the sections substantially midway between the ends of the section and engaging the other section, operating means upon one end of the member to expand the other end, box hole anchoring means upon the expansible end of the member, and clamping means independent of the operating means to clamp a cable or conduit within the member.

4. A connecter comprising a member formed of two longitudinal sections, rockers upon one of the sections substantially midway between the ends of the section and engaging the other section, closure means closing the space between the sections caused by the rockers, operating means upon one end of member to expand the other end, box hole anchorage means upon the expansible end of the member, and clamping means independent of the operating means to clamp a cable or conduit within the member.

5. A connecter comprising a member formed of two longitudinal sections, rockers upon one of the sections substantially midway between the ends of the section and engaging the other section, operating means upon one end of the member to expand the other end, a box hole anchorage groove upon the expansible end of the member, and clamping means independent of the operating means to clamp a cable or conduit within the member.

6. A connecter comprising a member formed of two longitudinal sections, rockers upon one of the sections substantially midway between the ends of the section and engaging the other section, operating means upon one end of the member to expand the other end, the expansible end of the member being threaded, and clamping means independent of the operating means to clamp a cable or conduit within the member.

7. A connnecter comprising a member formed of two longtudinal sections, rockers upon one of the sections substantially midway between the ends of the section and engaging the other section, operating means upon one end of the member to expand the other end, a box hole anchorage groove upon the expansible end of the member, the expansible end of the member being threaded, and clamping means independent of the operating means to clamp a cable or conduit within the member.

8. A connecter comprising a member formed of two longitudinal sections, rockers upon one of the sections substantially midway between the ends of the section and engaging the other section, operating means upon one end of the member to rock the sections upon the rockers and expand the other end, box hole anchorage means upon the expansible end of the member, and a clamping means independent of the operating means upon one of the sections to clamp a cable or conduit within the member.

9. A connecter comprising a member formed of two longtudinal sections, rockers upon one of the sections substantially midway between the ends of the section and engaging the other section, operating means upon one end of the member to expand the other end, box hole anchorage means upon the expansible end of the member, a U-shaped clamping member upon one of the sections to clamp a cable or conduit within the member, and a clamp screw engaging the clamping member to enforce movement thereof against a cable or conduit.

10. A connecter comprising a member formed of longitudnal sections, means upon the member to rock the sections relatively to each other to expand and contract one end of the member, a groove upon the expansible end of the member, threaded means upon the expansible end of the member, and means independent of the rocking means to clamp a cable or conduit to the member.

11. A connecter comprising a member formed of longitudinal sections, means upon the member to rock the sections relatively to each other to expand and contract one end of the member, screw threads upon the expansible end of the member, a groove adjacent the screw threads upon the expansible end of the member, and means independent of the rocking means to clamp a cable or conduit to the member.

12. A box assembly comprising a box having a threaded opening therein, a member formed of two longitudinal sections, rockers upon one of the sections substantially midway between the ends of the section and engaging the other section, operating means upon one end of the member to expand the other end, the expansible end of the member being threaded for engagement with the threaded opening in the box upon expansion thereof, and clamping means independent of the operating means to clamp a cable or conduit within the member.

13. A box assembly comprising a box having an opening therein, a member formed of two longitudinal sections, rockers upon one of the sections substantially midway between the ends of the section and engaging the other section, operating means upon one end of the member to expand the other end, the expansible end of the member being threaded, threaded means engaged by the threads on the expansible end of the member upon expansion thereof by the operating means, and clamping means independent of the operating means to clamp a cable or conduit within the member.

In testimony whereof I affix my signature.

STEPHEN N. BUCHANAN.